(12) United States Patent
Watanabe et al.

(10) Patent No.: US 8,214,620 B2
(45) Date of Patent: Jul. 3, 2012

(54) COMPUTER-READABLE RECORDING MEDIUM STORING DATA STORAGE PROGRAM, COMPUTER, AND METHOD THEREOF

(75) Inventors: Takashi Watanabe, Kawasaki (JP); Yasuo Noguchi, Kawasaki (JP); Kazutaka Ogihara, Kawasaki (JP); Masahisa Tamura, Kawasaki (JP); Yoshihiro Tsuchiya, Kawasaki (JP); Tetsutaro Maruyama, Kawasaki (JP); Tatsuo Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 12/625,965

(22) Filed: Nov. 25, 2009

(65) Prior Publication Data

US 2010/0250855 A1 Sep. 30, 2010

(30) Foreign Application Priority Data

Mar. 31, 2009 (JP) .................................. 2009-87385

(51) Int. Cl.
*G06F 12/00* (2006.01)
*G06F 13/00* (2006.01)
*G06F 13/28* (2006.01)

(52) U.S. Cl. ....................... 711/171; 711/126
(58) Field of Classification Search .................. 711/118, 711/126, 170–171
See application file for complete search history.

(56) References Cited

U.S. PATENT DOCUMENTS

| | | | | |
|---|---|---|---|---|
| 6,718,444 B1 * | 4/2004 | Hughes | ......................... | 711/155 |
| 7,299,323 B2 * | 11/2007 | Cho | .............................. | 711/155 |
| 7,908,443 B2 * | 3/2011 | Hillier et al. | ................... | 711/155 |
| 8,103,903 B2 * | 1/2012 | Hafner et al. | ................. | 714/6.24 |
| 2006/0200502 A1 * | 9/2006 | Tanaka et al. | ................. | 707/203 |

FOREIGN PATENT DOCUMENTS

| | | |
|---|---|---|
| JP | 09-330185 | 12/1997 |
| JP | 2004-062759 | 2/2004 |
| JP | 2008-204287 | 9/2008 |

* cited by examiner

*Primary Examiner* — Jared Rutz
*Assistant Examiner* — Ryan Bertram
(74) *Attorney, Agent, or Firm* — Staas & Halsey LLP

(57) ABSTRACT

A computer-readable recording medium storing a data storage program, a method and a computer are provided. The computer includes a cache table including an address area for storing an address and a user data area for storing user data corresponding to the address, and executes an operation including, reading user data at a specified address from a recording medium, delta-decoding the read difference data, and determining the decompressed user data to be the read user data, and writing the read user data in the user data area of the cache table when a size of the user data read by the delta-decoding is equal to or less than a threshold value and writing an address corresponding to the read user data in the address area of the cache table, obtaining difference data between the user data requested to be written and the corresponding user data and writing the difference data.

12 Claims, 8 Drawing Sheets

FIG. 2

| LBA, DATA LENGTH | DISK LBA, DATA LENGTH | TYPE |
|---|---|---|
| 0, 10 | 100, 5 | COMPRESSED LOG |
| 11, 10 | 105, 4 | COMPRESSED LOG |
| 21, 4 | 109, 1 | DIFFERENCE LOG |

FIG. 3

| LBA, DATA LENGTH | DISK LBA | DATA |
|---|---|---|
| 100, 8 | 150 | ABCDEFG... |
| 200, 4 | 160 | LMNOPQR... |

EXAMPLES OF HEADER

| HEADER OF COMPRESSED LOG | HEADER OF DIFFERENCE LOG |
|---|---|
| TYPE=COMPRESSED LOG DATA | TYPE=DIFFERENCE LOG DATA |
| DATA LENGTH | DATA LENGTH |
| COMPRESSION ALGORITHM | DIFFERENCE ALGORITHM |
| COMPRESSION PARAMETER | ORIGINAL DATA POSITION |
| LBA | LBA |
| ⋮ | ⋮ |
| CHECKSUM | CHECKSUM |

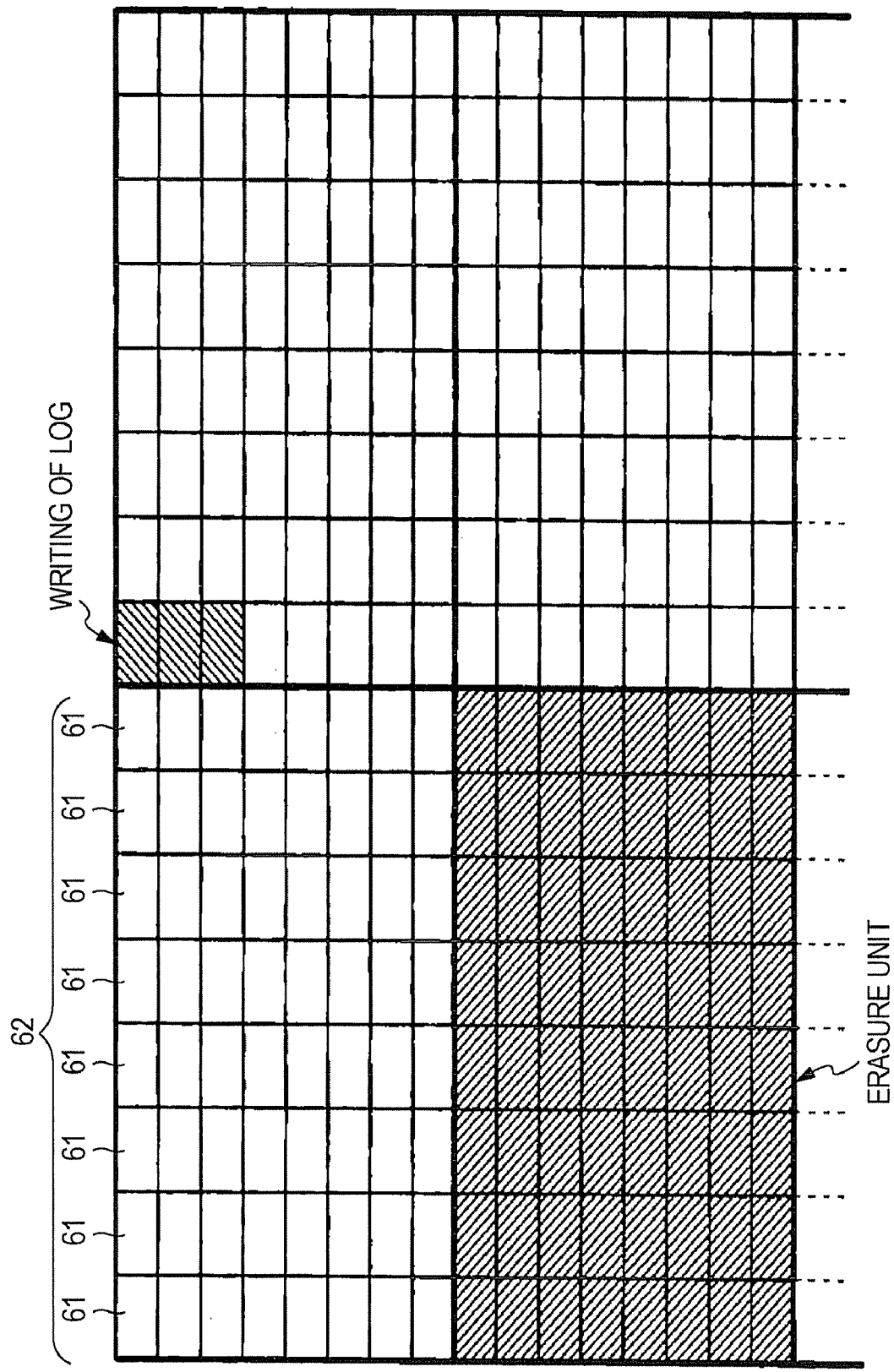

COMPUTER-READABLE RECORDING MEDIUM STORING DATA STORAGE PROGRAM, COMPUTER, AND METHOD THEREOF

CROSS-REFERENCE TO RELATED APPLICATIONS

This application is based upon and claims the benefit of priority of the prior Japanese Patent Application No. 2009-087385, filed on Mar. 31, 2009, the entire contents of which are incorporated herein by reference.

BACKGROUND

1. Field

Various embodiment(s) discussed herein relate to a technique of storing data including by using a computer.

2. Description of the Related Art

When a computer updates data stored in a storage device, it is generally common to identify the data on the basis of the address and rewrite the data at the address as new data.

Some of computers which manage a database employ log-format storage processing in which, when the database is updated, updated contents are sequentially recorded as logs separately from original data. Accordingly, if a failure occurs in the database, for example, updated data may be restored on the basis of the original data and the logs.

Further, related techniques include the techniques disclosed in the following documents: Japanese Unexamined Patent Application Publication Nos. 2004-062759, 2008-204287, and 09-330185.

SUMMARY

In an embodiment, a computer includes a cache table configured to include an address area for storing an address and a user data area for storing user data corresponding to the address, a reading unit configured to read user data at a specified address from a recording medium, a delta decoding unit configured to, when the read user data is difference data, decompress the read difference data, and determines the decompressed user data to be the read user data, a cache writing unit configured to, when a size of the user data read is equal to or less than a threshold value, write the read user data in the user data area of the cache table, and write an address corresponding to the read user data in the address area of the cache table. The computer includes a difference acquisition unit configured to, when the size of user data requested to be written in the recording medium is equal to or less than a threshold value, and when an address corresponding to the user data requested to be written is present in the cache table, obtain difference data by the delta-encoding between the user data requested to be written and the corresponding user data in the cache table; and a difference data writing unit configured to write the difference data in the recording medium.

The object and advantages of the invention will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a diagram illustrating a data structure of a block map table;

FIG. 3 is a diagram illustrating a data structure of a cache table;

FIG. 10 is an explanatory diagram illustrating a writing method of an SSD.

DETAILED DESCRIPTION OF EMBODIMENTS

Figure 1:
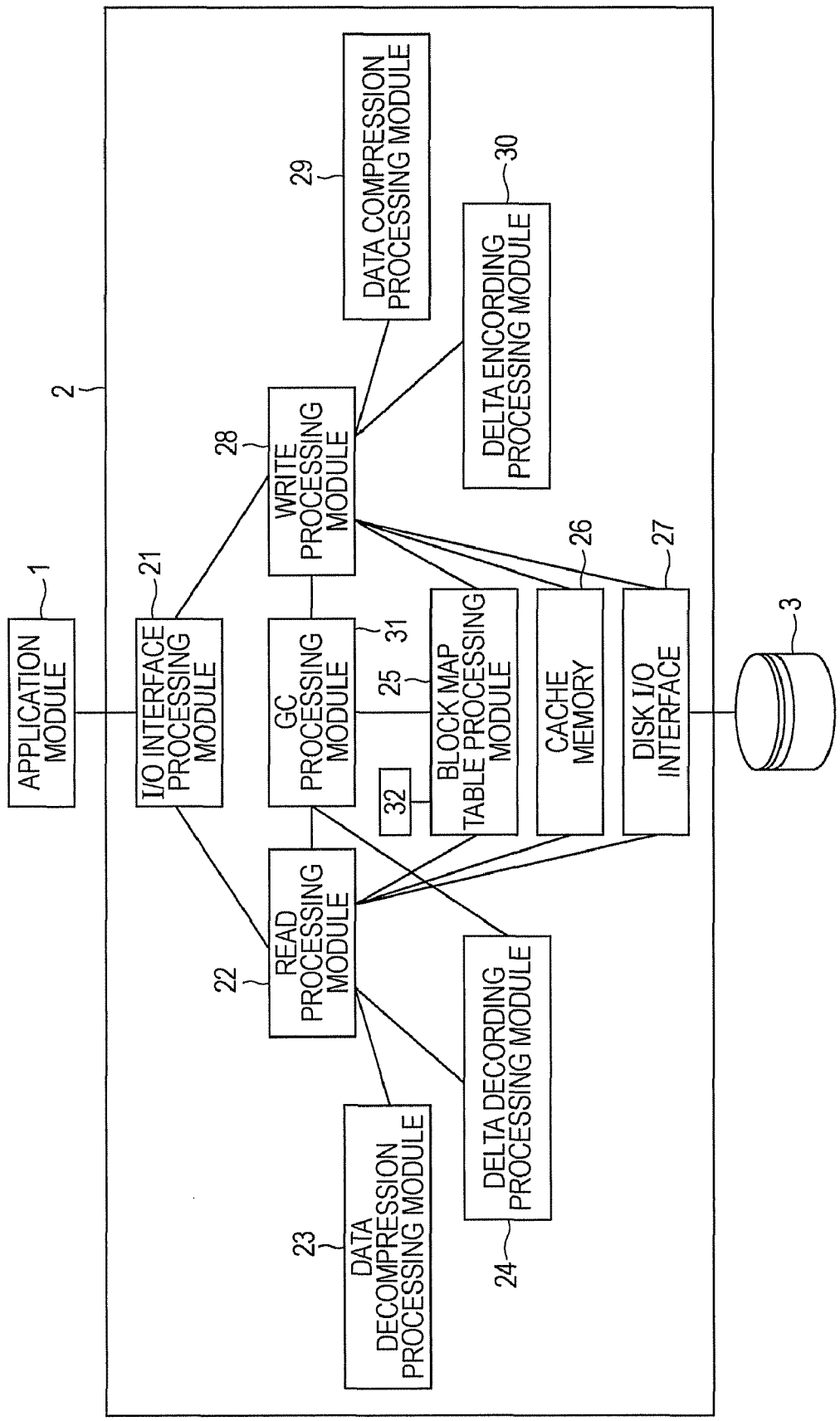
FIG. 1 is a schematic diagram of a computer according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Generally, when accessing a storage device, a computer accesses the storage device in predetermined units. For example, a computer performs reading and writing operations on a disk-like storage device for every sector, which is the minimum recording unit.

Further, a computer performs reading and writing operations in cluster units each being a collection of a plurality of sectors or in page-size (typically 4 KB) units, depending on the specification of an OS (Operating System) employed by the computer.

That is, a computer reads and writes data in read and write units determined by the specification of the OS and the storage device. Therefore, when a computer employs an OS using a page size as the read and write unit and writes new data having a smaller size than the page size, for example, the computer reads old data into a memory in the page-size units. Then, the computer performs a series of processes of changing a part of the old data into new data in the memory and writing data into the storage device in the page-size units, i.e., a so-called read-modify-write operation.

Therefore, when data having a smaller size than the page size is stored in log format into a storage device by a computer employing an OS using the page size as the read and write unit, the read-modify-write operation is performed to record logs.

That is, in the log-format storage processing, even if new data has a smaller size than the read and write unit, a read and write unit of log is added. Thus, there is an issue of redundant data written in addition to the new data. Therefore, a storage area is unnecessarily occupied by the redundant data, and the use efficiency of the storage device is reduced. Further, extra time is required to write the redundant data.

Computers disclosed in at least some of the embodiment(s) provide, as an example, a technique of suppressing storage of redundant data in a log-format data storage.

With reference to the drawings, examples of the embodiments of the present invention will be described in detail below. The configurations of the following embodiments are illustrated as examples. Therefore, the present invention is not limited to the configurations of the embodiments.

FIG. 1 is a schematic diagram of a computer according to an embodiment.

A computer 10 according to an embodiment includes an application module 1, a storage control module 2, and a storage device 3.

The application module 1 performs processing involving reading of user data from the storage device 3 and writing of user data into the storage device 3. For example, the application module 1 performs processes such as creation of a text, table calculation, application of a database, and image display, and instructs the storage device 3 to read and write data such as a text, a table, and an image in accordance with the above-described processes. The application module 1 of an embodiment, for example, requests the data reading and writing to be performed with a page size of 4 KB set as the read and write unit.

The storage device 3, which includes a storage medium, writes data into the storage medium to store the data therein, and reads data stored in the storage medium. The storage device 3 includes, for example, an HDD (Hard Disk Drive), a BD (Blu-ray Disk) drive, a DVD (Digital Versatile Disk) drive, a CD (Compact Disk) drive, and a memory card device. Further, the storage medium includes, for example, a non-volatile semiconductor memory (flash memory), a hard disk, a BD, a DVD, a CD, a memory card, and a flexible disk. The storage medium, examples of which are listed above, may be attachable to and detachable from the storage device 3, or may be fixedly attached in the storage device 3. The storage medium of an embodiment is a computer-readable medium.

On the basis of a request from the application module 1, the storage control module 2 controls the data reading and writing on the storage device 3. The storage control module 2 of an embodiment, for example, causes the user data to be stored in log format into the storage device 3.

That is, logs are successively written even in data updating, and the address at which each of the logs is written is determined every time the log is written, in accordance with the available space in the disk.

Meanwhile, the application module 1 does not request log-format processing. In data updating, for example, the application module 1 requests the writing operation to be performed in a common procedure of writing new data over old data by specifying the same address as the address of the old data.

Therefore, the storage control module 2 stores, in a block map table, a correspondence relationship between a logical address specified by the application module 1 as a storage destination of the user data and the address on the disk, at which the user data is actually written as a log. Then, on the basis of the block map table, the storage control module 2 reads and writes the user data.

The storage control module 2 includes an I/O (Input/Output) interface processing module 21, a read processing module 22, a data decompression processing module 23, a delta decoding processing module 24, a block map table processing module 25, a cache memory 26, and a disk I/O interface 27. The storage control module 2 further includes a write processing module 28, a data compression processing module 29, a delta encoding processing module 30, a GC (Garbage Collection) processing module 31, and a memory 32.

The I/O interface processing module 21, which serves as an interface with the application module 1, transmits a read request received from the application module 1 to the read processing module 22. Then, upon receipt from the read processing module 22 of data read in accordance with the read request, the I/O interface processing module 21 transmits the data to the application module 1. Further, the I/O interface processing module 21 transmits a write request received from the application module 1 to the write processing module 28. Herein, the read request refers to a signal including a code representing the reading operation and an address specifying the reading position. Further, the write request refers to a signal including a code representing the writing operation, an address at which the writing operation is to be performed, and the user data to be written.

The memory 32 includes the block map table stored by the block map table processing module 25. FIG. 2 is a diagram illustrating a data structure of the block map table.

The block map table illustrated in FIG. 2 stores storage positions on a disk of data items successively written in log format, and types of the data items. That is, the user data is written in log format, and thus the block map table stores a correspondence relationship between a logical address specified by the application module 1 as a storage destination of the user data and the address on the disk, at which the user data is actually written as a log.

The block map table of FIG. 2 includes, for example, items such as the LBA (Logical Block Addressing) and a data length thereof, the disk LBA and the data length thereof, and the type. The LBA refers to an address specified by the application module 1. The disk LBA refers to an address on, the disk of the specified data. The type refers to whether the data stored as a log is a compressed log or a difference log.

The cache memory 26 includes a cache table stored by the read processing module 22. FIG. 3 is a diagram illustrating a data structure of the cache table.

The cache table illustrated in FIG. 3 stores the read user data and the address thereof such that the user data and the address are associated with each other, and the cache table is used to determine whether or not a given data has been subjected to the reading operation, i.e., whether or not a given data is to be subjected to the read-modify-write operation. The cache table of FIG. 3 includes, for example, items such as the LBA and the data length thereof, the disk LBA, and the user data.

The data compression processing module 29 compresses the user data corresponding to the write request transmitted to the write processing module 28. The data compression processing module 29 employs, as a compression algorithm for example, a well-known algorithm such as LZ (Lempel-Ziv) 77 and Deflate. The compression algorithm may be any algorithm, as long as the algorithm performs lossless compression.

When the user data corresponding to the write request transmitted to the write processing module 28 is subjected to the read-modify-write operation, the delta encoding processing module 30 obtains a difference between the read data and the data to be written, and writes the difference. Thereby, the data to be written is compressed. If the size of the user data corresponding to the write request is equal to or less than a threshold value, i.e., equal to or less than the page size, and if the specified address is present in the above-described cache table, the delta encoding processing module 30 determines that the user data is the data to be subjected to the read-modify-write operation.

The write processing module 28 serves as a writing module which writes the data compressed by the data compression processing module 29 and the data subjected to differential compression by the delta encoding processing module 30 into the storage device 3 via the disk I/O interface 27. Further, the write processing module 28 also erases data in the storage device 3.

Figures 4, 5:
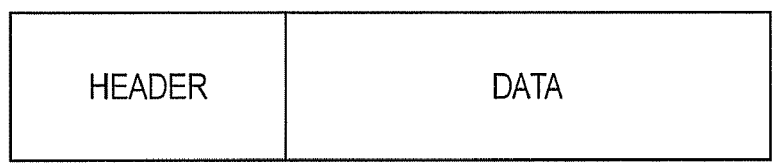
FIG. 4 is a diagram illustrating a data structure of a log.
FIG. 5 is an explanatory diagram illustrating headers each added to a log.

The write processing module 28 writes compressed data and difference data in log format. Herein, the write processing module 28 adds a header to the user data to form a log. FIG. 4 illustrates a data structure of the log.

FIG. 5 is an explanatory diagram of headers each added to a log. The headers illustrated in FIG. 5 include information related to a type, a data length, an algorithm, a compression parameter, an original data position, a LBA, a checksum, and so forth. In FIG. 5, the type refers to whether a given log is a difference log or a non-difference log. In an embodiment, for example, the non-difference log is compressed to be stored, and thus is referred to as the compressed log.

The data length refers to the size of a log including a header and user data. The algorithm refers to the type of algorithm used in the compression or differential processing. The compression parameter refers to the information used in the compression, such as the threshold value for determining whether or not to perform the compression.

The original data position refers to the address of the data being the source of the difference of the difference log. The LBA refers to the address specified by the application module 1. The checksum refers to the code for detecting an error in data. The code is not limited to the checksum. Thus, another error correction code may be used.

The read processing module 22 serves as a reading module which reads the user data at the address specified by the read request from the storage device 3 via the disk I/O interface 27. Further, the read processing module 22 includes a cache management module 22A serving as a cache writing module which caches the data read into the cache table of the cache memory 26. If the size of the read user data is equal to or less than a threshold value, the cache management module 22A writes the read user data into a user data area of the cache table, and writes the specified address in an LBA area of the cache table.

When the read processing module 22 has read from the storage device 3 the compressed data compressed by the data compression processing module 29 and recorded, the data decompression processing module 23 performs decompression processing on the compressed data to bring the data back to the pre-compression state. Herein, the decompression processing may be performed by a procedure reverse to the processing according to the compression algorithm employed by the data compression processing module 29, e.g., the compression. The compression algorithm is a well-known algorithm such as LZ77 and Deflate, and the procedure of decompression is also well known. Therefore, detailed description thereof will be omitted.

If the data read by the read processing module 22 is difference data, the delta decoding processing module 24 adds the difference data to the original data, from which the difference has been obtained, to thereby decompress the difference data and restore the user data, and transmits the user data to the read processing module 22.

The block map table processing module 25 stores, in the block map table, the storage position and the type of the user data written by the write processing module 28. The block map table of an embodiment, for example stores, as the storage position, the LBA specified by the application module 1 and the disk LBA.

The GC processing module 31 performs GC processing such as the deletion of unnecessary data on the basis of the block map table. For example, the GC (Garbage Collection) processing module 31 periodically searches the block map table, and detects and deletes data which is no longer the reference source of the difference data. The garbage collection refers to a procedure of removing any unwanted data (data deemed unnecessary) by identifying same from among stored data based on one or more conditions.

In the components constituting the computer 10 of an embodiment, for example, information processing components form hardware which combines basic circuits that perform specific operations to achieve the respective functions of the circuits. Further, a part or all of the information processing components may achieve the respective functions when a general-purpose processor executes a program as software. Similarly, any of operations of the storage control module 2 (FIG. 1) may be implemented using hardware or software components and elements, or any combination thereof.

In the computer 10, the application module 1, the I/O interface processing module 21, the read processing module 22, the data decompression processing module 23, the delta decoding processing module 24, and the block map table processing module 25 are included in the above-described information processing components. Further, the disk I/O interface 27, the write processing module 28, the data compression processing module 29, the delta encoding processing module 30, and the GC processing module 31 are also included in the above-described information processing components.

The hardware formed by the information processing components includes basic circuits such as an FPGA (Field Programmable Gate Array), an ASIC (Application Specific Integrated Circuit), and an LSI (Large Scale Integration). Further, the hardware may also include basic circuits such as an IC (Integrated Circuit), a gate array, a logic circuit, a signal processing circuit, and an analog circuit.

The logic circuit includes, for example, an AND circuit, an OR circuit, a NOT circuit, a NAND circuit, a NOR circuit, a flip-flop circuit, and a counter circuit. The signal processing circuit may include a circuit which performs, for example, addition, multiplication, division, inversion, product-sum operation, differentiation, and integration on a signal value. The analog circuit may include, for example, a circuit which performs amplification, addition, multiplication, differentiation, and integration on a signal value.

Figure 6:
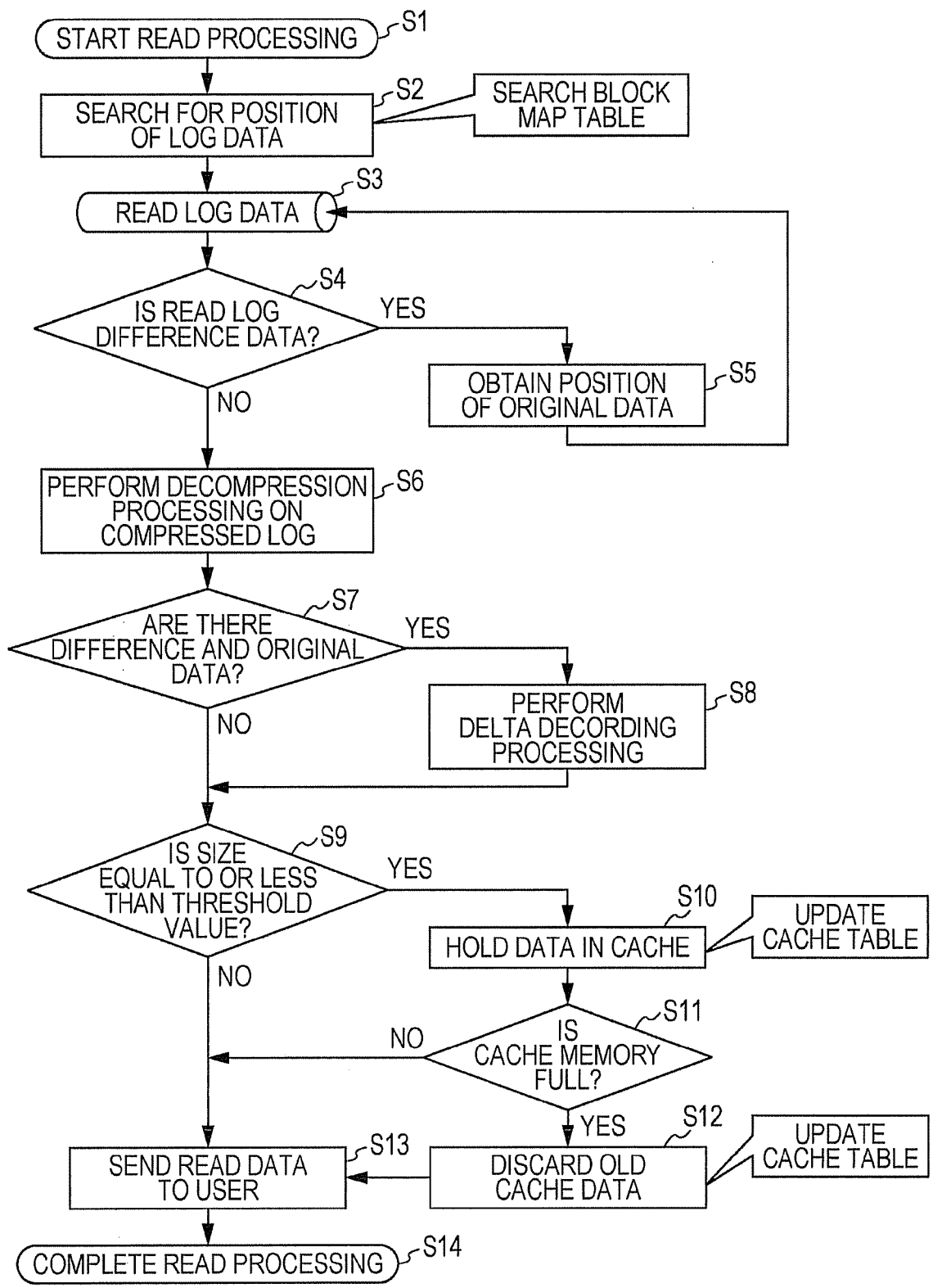
FIG. 6 is an explanatory diagram illustrating data reading by a computer.

FIG. 6 is an explanatory diagram of data reading by the computer 10 configured as described above. Upon receipt of a read request from the application module 1, the read processing module 22 starts a read processing (Operation S1).

The read processing module 22, for example, searches for a position of log data in the block map table to obtain a disk LBA corresponding to the LBA specified by the read request (Operation S2), and reads log data from the obtained disk LBA (Operation S3).

Further, the read processing module 22 refers to a type in the block map table, and determines whether or not the read log is a difference log (Operation S4). If the read data is a difference log (YES at Operation S4), the read processing module 22 refers to a header of the difference log, and obtains the position, which is the address in an embodiment, for example, at which the original data is stored (Operation S5). Then, the read processing module 22 returns to the process of Operation S3 to read the original data, and determines whether or not the read log is a difference log (Operation S4). Herein, if the read log is a difference log, the procedure advances to the process of Operation S5 to repeat the processes of Operations S5, S3, and S4 until the compressed log as the source of the difference is obtained.

If the read user data is a compressed log (NO at Operation S4), the data decompression processing module 23 performs decompression processing on the compressed log to restore uncompressed user data (Operation S6).

The delta decoding processing module 24 determines whether or not the read log includes a difference log (Operation S7). If the read log includes a difference log (YES at Operation S7), the delta decoding processing module 24 performs decompression processing on the difference log, i.e., adds the difference data of the difference log to the user data being the difference source, to thereby obtain the updated user data (Operation S8).

The cache management module 22A of the read processing module 22 determines whether or not the size of the user data decompressed at Operation S6 or S8 is equal to or less than a predetermined threshold value. In an embodiment, for example, the page size is set to be the threshold value. Further, in an embodiment, for example, the minimum read and write unit is the page size. Therefore, the cache management module 22A determines whether the size of the read data is equal to or less than the page size (YES at Operation S9) or exceeds the page size (NO at Operation S9).

If the size of the user data is equal to or less than the threshold value (YES at Operation S9), the cache management module 22A stores the user data, the LBA, and the disk LBA in the cache table (Operation S10). Herein, if the cache table is full (YES at Operation S11), the cache management module 22A discards old cache data (Operation S12).

Then, the read processing module 22 sends the read user data to the application module 1 (Operation S13), and completes the read processing (Operation S14).

Figure 7:
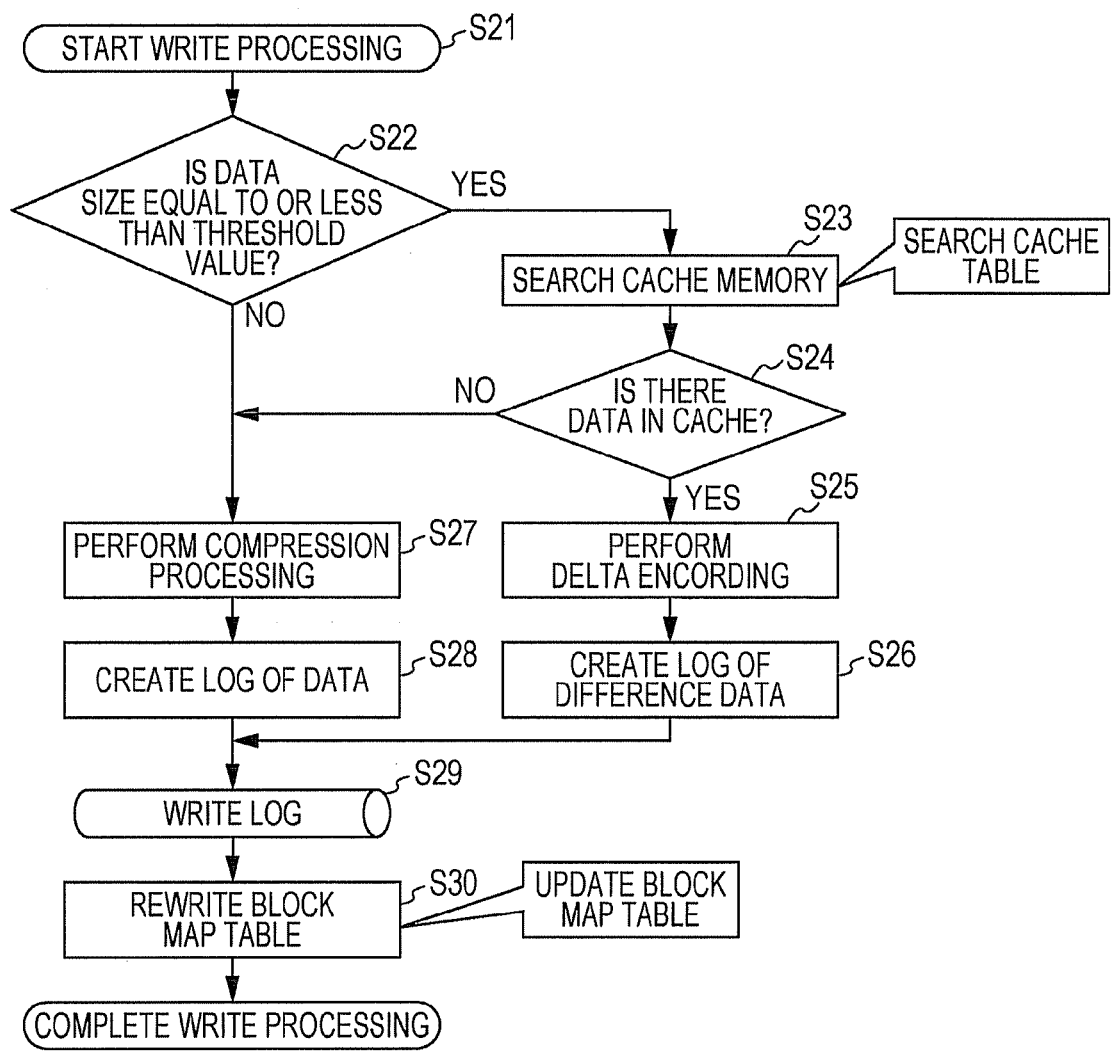
FIG. 7 is an explanatory diagram illustrating data writing by a computer.

FIG. 7 is an explanatory diagram of data writing by the computer 10.

Upon receipt of a write request from the application module 1, the write processing module 28 starts the write processing (Operation S21).

The write processing module 28 determines whether or not the size of the user data requested to be written is equal to or less than a threshold value (Operation S22). Herein, if the size of the user data is equal to or less than the threshold value (YES at Operation S22), the write processing module 28 searches the cache table, and determines whether or not the user data requested to be written is held in the cache table (Operation S24).

If the user data is held in the cache table at Operation S24 (YES at Operation S24), the delta encoding processing module 30 uses the user data held in the cache table as the original data, and obtains the difference between the original data and the user data requested to be written (Operation S25). Then, the delta encoding processing module 30 sets the header to include the original data position, the type indicating the difference log, the data length, the difference algorithm, and the checksum, and adds the header to the obtained difference to create a difference log (Operation S26).

Meanwhile, if the size of the user data exceeds the threshold value at Operation S22 (NO at Operation S22), or if the user data is not held in the cache table at Operation S24 (NO at Operation S24), the data compression processing module 29 performs compression processing on the user data (Operation S27): Then, the data compression processing module 29 sets the header to include the type indicating the compressed log, the data length, the information representing the compression algorithm, the compression parameter, and the checksum, and adds the header to the compressed user data to create a compressed log (Operation S28).

The write processing module 28 stores the difference log created at Operation S26 or the compressed log created at Operation S28 into the storage device 3 via the disk I/O interface 27 (Operation S29). If the size of the difference log is equal to or less than the threshold value, the write processing module 28 may temporarily write the difference log in the memory, and may collectively write difference logs into the storage device 3 when the size of the difference logs exceeds the threshold value. For example, if the read and write unit of the storage device 3 is 512 bytes, and if the threshold value is set to be 400 bytes and the size of the difference logs accumulated in the memory exceeds 400 bytes, the write processing module 28 may write the difference logs into the storage device 3.

The block map table processing module 25 stores, in the block map table, the disk LBA at which the log has been written at Operation S29, the LBA specified by the application module 1 when the request to write the log has been made, and the type of the log such that the disk LBA, the LBA, and the type of the log are associated with one another (Operation S30).

Figure 8:
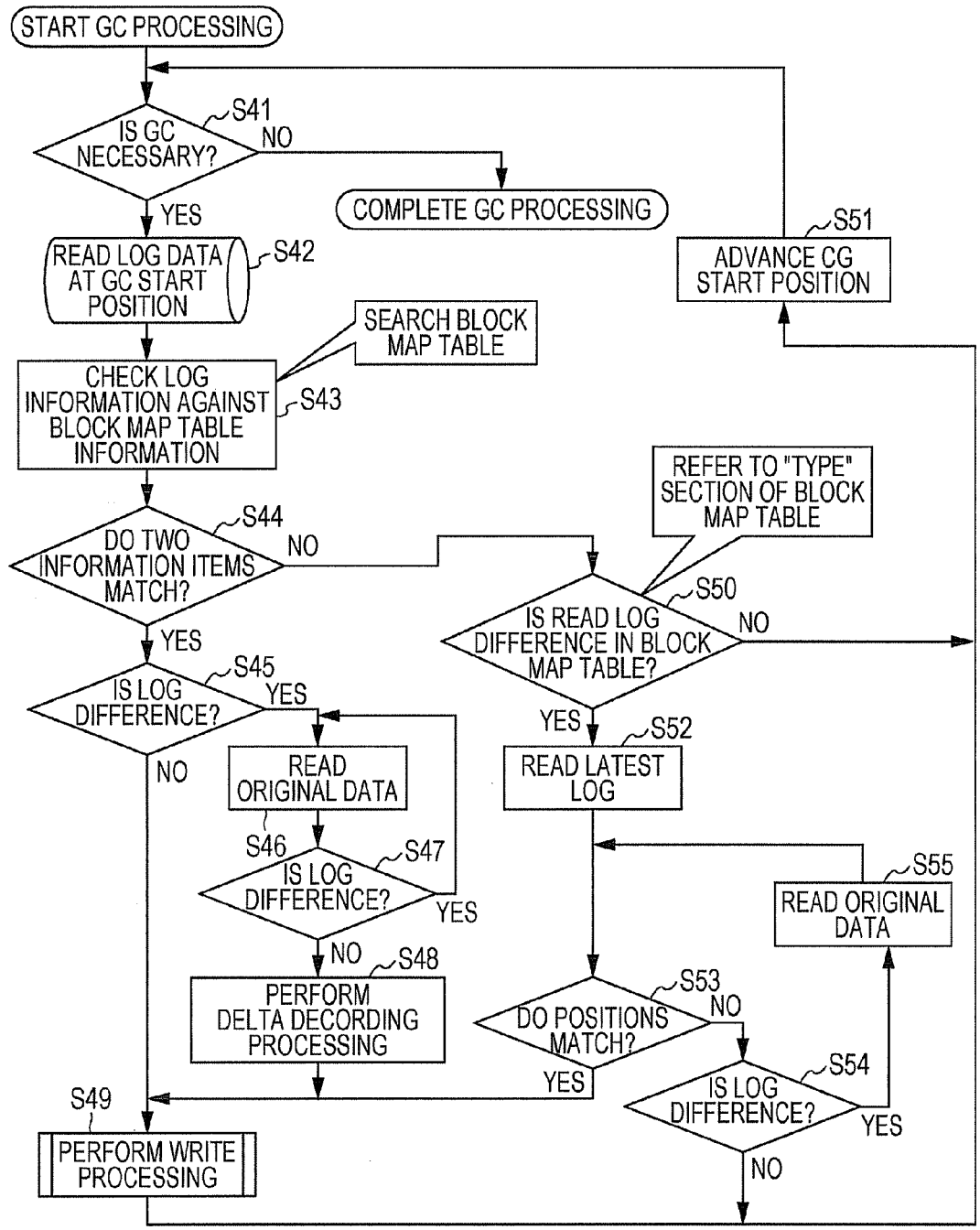
FIG. 8 is an explanatory diagram illustrating garbage collection by a computer.

FIG. 8 is an explanatory diagram of garbage collection by the computer 10.

The GC processing module 31 starts the GC processing at predetermined timing or periodically upon receipt of an instruction from a user or after the writing of the user data (Operation S41). The GC processing module 31 first determines whether or not the GC is necessary, i.e., whether or not the conditions for performing the GC are satisfied. The conditions for performing the GC include, for example, when the available space of the storage device 3 runs short, when a predetermined period of time has elapsed since the last GC, when the number of log writing operations has reached a predetermined number, and when the operating ratio of a CPU (Central Processing Unit) is equal to or less than a predetermined value. While specific examples of condition(s) are provided in association with FIG. 8, the present invention is not limited thereto.

If the GC is determined to be necessary (YES at Operation S41), the GC processing module 31 causes the read processing module 22 to read logs at a GC start position (Operation S42). In an embodiment, for example, the write processing module 28 writes logs in the storage device 3 in the order of the disk LBA. In the storage area of the storage device 3, therefore, the used area ranges from the disk LBA at which the sequential writing has started to the disk LBA at which the latest writing operation has been performed. The GC processing module 31 performs the processing thereof in ascending order of the disk LBA. Therefore, the minimum disk LBA among the disk LBAs in the used area corresponds to the first GC start position. The order of the GC processing and the GC start position may be set arbitrarily, as long as the logs on the disk may be sequentially processed.

The GC processing module 31 checks the information of the header of the read log against the information of the block map table (Operation S43), and determines whether or not the two information items match each other (Operation S44). The GC processing module 31 of an embodiment, for example compares the latest information in the block map table with the LBA and the data length thereof recorded in the header of the log read from the disk and the disk LBA at which the log has been read. If these information items match each other, the GC processing module 31 determines that the read data is the latest and necessary data.

Herein, if the read data is necessary data (YES at Operation S44), the procedure may directly move to the GC processing on the next log. However, the GC processing module 31 of an embodiment, for example rearranges read data items in a new area to perform defragmentation (Operations S45 to S49). That is, the GC processing module 31 of an embodiment, for example performs so-called copy GC.

Therefore, whether or not the read log is a difference log is determined at Operation S45. If the read log is a difference log, the original data is read (Operation S46). Further, whether or not the log read at Operation S46 is a difference log is determined, and the reading operation is repeated until the read log is no longer a difference log (Operations S46 and S47).

If the original data not being a difference log is read at Operations S46 and S47, the data decompression processing module 23 performs decompression processing on the compressed log to restore uncompressed user data. Then, the delta decoding processing module 24 performs decompression processing on the difference log, i.e., adds the difference data of the difference log to the user data being the difference source, to thereby obtain updated user data (Operation S48).

The GC processing module 31 obtains from the read processing module 22 the user data subjected to the delta decoding, and transmits the user data to the write processing module 28 to have the user data compressed by the data compression processing module 29 and written into the storage device 3 (Operation S49).

Further, if the read log is determined not to be a difference log at Operation S45 (NO at Operation S45), the GC processing module 31 obtains the read log from the read processing module 22, and transmits the read log to the write processing module 28 to have the read log written into the storage device 3 (Operation S49).

If the writing operation is newly performed at this Operation S49, the logs read at Operations 842 and S46 are unnecessary. Therefore, the GC processing module 31 advances the GC start position, which is the start position of the used area, to the next position (Operation S51). That is, with the GC start position thus advanced, the region written with the unnecessary logs is excluded from the used area, and becomes an unused area in which the writing operation may be newly performed. If the used area of the storage device 3 is not set to range from the GC start position to the latest write position, and if a method of randomly storing logs is employed, for example, the write processing module 28 may delete the unnecessary logs when the GC start position is advanced. Meanwhile, if the information of the read log does not match the information of the block map table at Operation S44 (NO at Operation S44), the GC processing module 31 determines whether or not the read log is a difference log (Operation S50). The mismatch between the two information items at Operation S44 occurs because the information of the read log is old and unnecessary data and thus is not registered in the block map table, or because another difference log has been created from the difference log read at Operation S42 and the information of the block map table includes the information of the latest difference log. That is, the difference log from which another difference has been created may be data necessary as the difference source of the latest difference log. Therefore, if the read log is determined not to be difference data at Operation S50 (NO at Operation S50), the read log is unnecessary data. Therefore, the procedure proceeds to Operation S51 without performing the write processing, to advance the GC start position.

Meanwhile, if the read log is determined to be a difference log at Operation S50 (YES at Operation S50), the GC processing module 31 reads the LBA from the header of the difference log read at Operation S42, and obtains from the block map table the latest log corresponding to the LBA. That is, the GC processing module 31 obtains from the block map table the disk LBA corresponding to the LBA, and causes the read processing module 22 to read the latest difference log recorded at the disk LBA (Operation S52). If the original data position written in the header of the difference data read at Operation S52 matches the position (disk LBA) of the difference log read at Operation S42 (YES at Operation S53), the GC processing module 31 determines that the logs read at Operations S42 and S52 are necessary. That is, the GC processing module 31 causes the logs read at Operations S42 and S52 to be subjected to the decompression processing by the delta decoding processing module 24, and causes the decompressed data to be transmitted to the write processing module 28, subjected to the compression processing by the data compression processing module 29, and written into the storage device 3 as compressed logs (Operation S49).

Further, if the two positions do not match each other at Operation S53 (NO at Operation S53), the GC processing module 31 determines whether or not the log read at Operation 552 is, difference data (Operation S54). If the read log is difference data (YES at Operation S54), there is a possibility that another difference log is present between the difference log read at Operation S42 and the difference log read at Operation S52. Therefore, the GC processing module 31 causes the read processing module 22 to read the log indicated by the original data position in the header of the log read at Operation S52 (Operation S55). At Operation S53, the GC processing module 31 repeats the processes of Operations S53 to S55 until the two positions match each other. If the two positions match each other (YES at Operation S53), the GC processing module 31 causes the logs read at Operations S42, S52, and S55 to be subjected to the decompression processing and written into the storage device 3 as compressed logs, as described above (Operation S49). If the log read at Operation S52 or S55 is not difference data (NO at Operation S54), i.e., the log read at Operation S42 is unnecessary as the original data of the latest difference log obtained from the block map table, the procedure proceeds to Operation S51 without performing the writing operation, to advance the GC start position to the next position.

The GC processing module 31 advances the GC start position, and repeats the processes of Operations S41 to S55. When the GC is no longer necessary (NO at Operation S41), the GC processing module 31 competes the processing.

As described above, if the size of the data written in log format is equal to or less than a predetermined threshold value, the computer according to an embodiment writes the data as difference data, and thus uses a smaller storage area than in the read-modify-write operation. Accordingly, the computer according to an embodiment may improve the use efficiency of a storage device.

Further, if the size of the data written in log format is equal to or less than a predetermined threshold value, the computer of an embodiment writes the data as difference data, and thus may reduce the writing time, as compared with the read-modify-write operation.

Further, if the read user data is the difference data, the computer of an embodiment decompresses the read difference data, writes the decompressed user data on the disk, and thereafter performs the garbage collection on the disk. Accordingly, the computer of an embodiment may perform defragmentation as well as the garbage collection.

Further, the computer of an embodiment uses the page size or the sector size as the threshold value, and thus may write the data having a size equal to or less than the threshold value as a difference log even in an environment in which the read and write unit is limited by the OS and the storage device.

Figure 9:
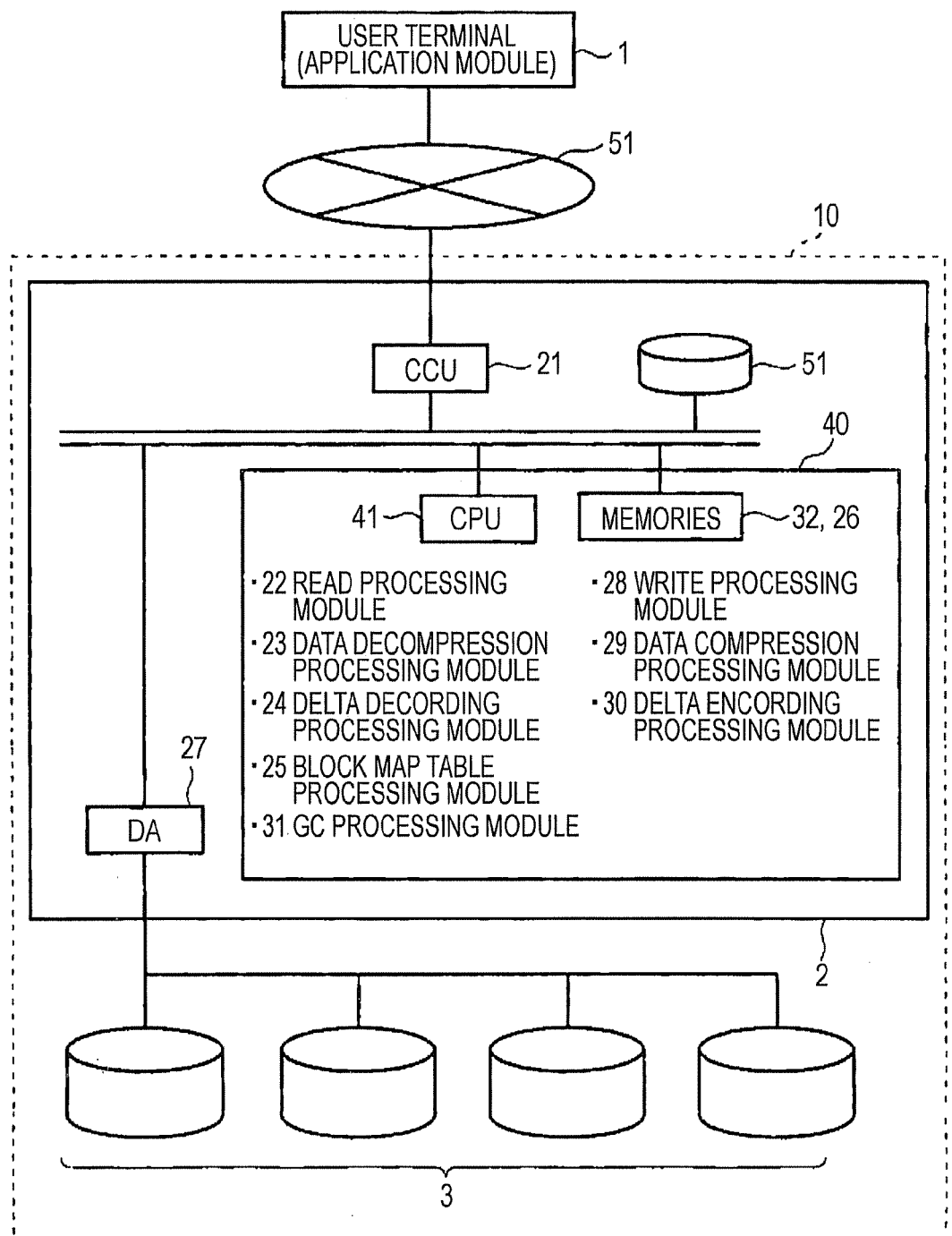
FIG. 9 is a schematic diagram illustrating a computer according to an embodiment.

FIG. 9 is a schematic diagram of a computer according to an embodiment. A computer 10 of an embodiment is a so-called data server (hereinafter referred to as the data server 10) which receives a read request and a write request of user data from a user terminal 1 via a network. In an embodiment; the same components as the components of the above-described embodiment will be assigned with the same reference numerals, for example, and redundant description thereof will be omitted.

The user terminal 1, which is a computer such as a personal computer and a workstation, is connected to the data server 10 via a network using fiber, wire, iSCSI (Internet Small Computer System Interface), or the like.

The data server 10 includes a storage device 3 and a control device 2 for controlling the storage device 3.

The control device 2 includes a CCU (Communication Control Unit) 21, an operation processing module 40, a storage module 51, and a DA (Disk Adaptor) 27.

The CCU 21, which serves as an interface for controlling the communication with the user terminal 1, transmits to the operation processing module 40 the read request and the write request received from the user terminal 1. Then, the CCU 21 receives from the operation processing module 40 user data read in accordance with the read request, and transmits the user data to the user terminal 1.

The storage module 51 stores an operating system (OS) and firmware (e.g., control program) installed therein.

Memories 32 and 26 are main memories from and into which a CPU 41 or the like may read and write data, and correspond to the memory 32 for storing the block map table and the cache memory 26, respectively.

The DA 27 corresponds to the foregoing disk I/O interface. The DA 27 is connected to the CPU 41 and the memories 32 and 26 via a bus, and receives the read request and the write request from the CPU 41. Then, the DA 27 reads data from the storage device 3 in accordance with the read request, and writes data into the storage device 3 in accordance with the write request.

The operation processing module 40, which includes the CPU 41 and the main memories, reads the above-described OS and firmware from the storage module 51 and executes the OS and firmware as required, and performs operation processing on the information input from the CCU 21 and the DA 27 and the information read from the storage module 51. With the operation processing according to the firmware, the operation processing module 40 of an embodiment, for example also functions as a read processing module 22, a data decompression processing module 23, a delta decoding processing module 24, and a block map table processing module 25. Further, the operation processing module 40 also functions as a write processing module 28, a data compression processing module 29, a delta encoding processing module 30, and a GC processing module 31.

Upon receipt of the read request from the user terminal 1 via the CCU 21, the operation processing module 40 performs the reading operation in a similar manner as in FIG. 6, functioning as the read processing module 22, the data decompression processing module 23, the delta decoding processing module 24, and the block map table processing module 25. That is, functioning as the read processing module 22 and so forth, the operation processing module 40 reads the user data from the storage device 3 via the DA 27, and transmits the read data to the user terminal 1 via the CCU 21.

Further, upon receipt of the write request from the user terminal 1 via the CCU 21, the operation processing module 40 performs the writing operation in a similar manner as in FIG. 7, functioning as the write processing module 28, the data compression processing module 29, the delta encoding processing module 30, the block map table processing module 25, and so forth. That is, functioning as the write processing module 28, the operation processing module 40 writes the user data into the storage device 3 via the DA 27.

Further, the operation processing module 40 performs the GC processing in a similar manner as in FIG. 8, functioning as the GC processing module 31, the block map table processing module 25, and so forth.

A data server as described above may also exhibit similar effects as the effects of the previous described embodiment. That is, if the size of the data written in log format is equal to or less than a predetermined threshold value, the data server 10 writes the data as difference data. Therefore, a smaller storage area is used than in the read-modify-write operation, and the use efficiency of a storage device may be improved.

The DA 27 may be configured to include a processor and perform operation processing according to the firmware to function as the read processing module 22, the data decompression processing module 23, the delta decoding processing module 24, and the block map table processing module 25, in place of the above-described operation processing module 40. Further, the DA 27 may also function as the write processing module 28, the data compression processing module 29, the delta encoding processing module 30, and the GC processing module 31.

In the embodiment described above, the storage device 3 may be an SSD (Solid State Drive). Except for the use of the SSD, this embodiment is the same in configuration as the embodiment described above. Therefore, the same components will be assigned with the same reference numerals, for example, and redundant description thereof will be omitted.

FIG. 10 is an explanatory diagram of a writing method of the SSD. In the SSD, there are concepts of "page" and "block" as a minimum unit for managing data. When files are recorded in the SSD, an area is allocated to each of the files, with a page 61 of 8 KB set as the minimum unit, for example. Meanwhile, when data is erased, the processing is performed in blocks 62 each having 512 KB and corresponding to a collection of sixty-four pages 61.

Further, in the SSD, if the read-modify-write operation is performed in a common method such that the read data is written back to the same address, the data to be updated is read, and the read data is changed. Then, the original data in the SSD is erased, and the changed data is written back. That is, data is not simply overwritten with new data, but it is necessary to erase the data and then write new data back. Therefore, it is necessary to perform the read-modify-write operation in block units each forming the minimum unit for erasing data.

Meanwhile, a computer 10 of an embodiment writes data in log format. Therefore, it is unnecessary to erase the original data every time the writing operation is performed, and the writing operation may be performed in page units.

Particularly, when writing data having a size equal to or less than the page unit, the computer 10 of an embodiment writes the data as a difference log in a similar manner as in FIG. 7. Therefore, the area for storing data may be reduced to the minimum size.

Therefore, the computer 10 of an embodiment generally improves the use efficiency of the SSD serving as the storage device 3. Further, the computer 10 of an embodiment generally reduces a number of required erasures of data in the SSD, and thus may increase the life of the SSD.

The computer 10 of an embodiment may also perform the read processing in a similar manner as in FIG. 6 and perform the GC processing in a similar manner as in FIG. 8.

Further, in the embodiment described above, the storage device 3 may be an SSD. Even if the data server 10 of the previously described embodiment is configured to employ an SSD as the storage device 3, similar effects as the effects of another embodiment may be obtained.

The present invention is not limited only to the illustrated examples described above. It is of course possible to add a variety of modifications within the scope not departing from the gist of the present invention.

The data processing method described in the present embodiments can be achieved by causing a computer such as a personal computer and a workstation to execute a previously prepared program. The program is recorded in a computer-readable recording medium such as a hard disk, a flexible disk, a CD-ROM (Compact Disk-Read Only Memory), an MO (Magneto-Optical disk), and a DVD, and is read from the recording medium by a computer to be executed. Further, the program may be a medium distributable through a network such as the Internet.

Accordingly, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/dr a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. A computer-readable recording medium storing a data storage program that causes a computer, which includes a cache table including an address area for storing an address and a user data area for storing user data corresponding to the address, the program causing the computer to execute an operation, comprising:

reading user data at a specified address from a recording medium;

executing a delta-decoding of read difference data when determining that the read user data is difference data, and determining the decompressed user data to be the read user data;

writing the read user data in the user data area of the cache table when a size of the user data read by the delta-decoding is equal to or less than a threshold value, and writing an address corresponding to the read user data in the address area of the cache table;

obtaining difference data by the delta-encoding between the user data requested to be written and the corresponding user data in the cache table when a size of user data requested to be written in the recording medium is equal to or less than a threshold value, and when an address corresponding to the user data requested to be written is present in the cache table; and writing the difference data in the recording medium.

2. The computer-readable recording medium according to claim 1, comprising:

performing a garbage collection with respect to the recording medium after writing the decompressed user data in the recording medium when determining that the read user data is the difference data, decompressing the read difference data.

3. The computer-readable recording medium according to claim 1, wherein the threshold value corresponds to a page size or a sector size.

4. The computer-readable recording medium according to claim 2, wherein the threshold value corresponds to a page size or a sector size.

5. A computer, comprising:

a cache table configured to include an address area for storing an address and a user data area for storing user data corresponding to the address;

a reading unit configured to read user data at a specified address from a recording medium;

a delta decoding unit configured to decompress the read difference data and determine the decompressed user data to be the read user data when determining that the read user data is difference data;

a cache writing unit configured to write the read user data in the user data area of the cache table and write an address corresponding to the read user data in the address area of the cache table when a size of the user data read by the delta decoding unit is equal to or less than a threshold value;

a difference acquisition unit configured to obtain difference data by the delta-encoding between the user data requested to be written and the corresponding user data in the cache table when a size of user data requested to be written in the recording medium is equal to or less than a threshold value, and an address corresponding to the user data requested to be written is present in the cache table; and a difference data writing unit configured to write the difference data in the recording medium.

6. The computer according to claim 5, comprising:

a garbage collection unit configured to decompress the read difference data, write the decompressed user data in the recording medium, and thereafter perform garbage collection on the recording medium when the read user data is the difference data.

7. The computer according to claim 5, wherein the threshold value corresponds to a page size or a sector size.

8. The computer according to claim 6, wherein the threshold value corresponds to a page size or a sector size.

9. A data storage method performed by a computer which includes a cache table including an address area for storing an address and a user data area for storing user data corresponding to the address, the method comprising:
- reading user data at a specified address from a recording medium;
- performing a delta-decoding the read difference data when the read user data is difference data, and determining the decompressed user data to be the read user data;
- writing the read user data in the user data area of the cache table when a size of the user data read by the delta-decoding is equal to or less than a threshold value, and writing an address corresponding to the read user data in the address area of the cache table;
- obtaining difference data by the delta-encoding between the user data requested to be written and the corresponding user data in the cache table when a size of user data requested to be written in the recording medium is equal to or less than a threshold value, and when an address corresponding to the user data requested to be written is present in the cache table; and
- writing the difference data in the recording medium.

10. The method according to claim 9, comprising:
- performing a garbage collection with respect to the recording medium after writing the decompressed user data in the recording medium when the read user data is the difference data, decompressing the read difference data.

11. The method according to claim 9, wherein the threshold value corresponds to a page size or a sector size.

12. The method according to claim 10, wherein the threshold value corresponds to a page size or a sector size.

* * * * *